No. 806,646. PATENTED DEC. 5, 1905.
W. J. CURRY.
GRATER.
APPLICATION FILED JAN. 11, 1905. RENEWED NOV. 9, 1905.
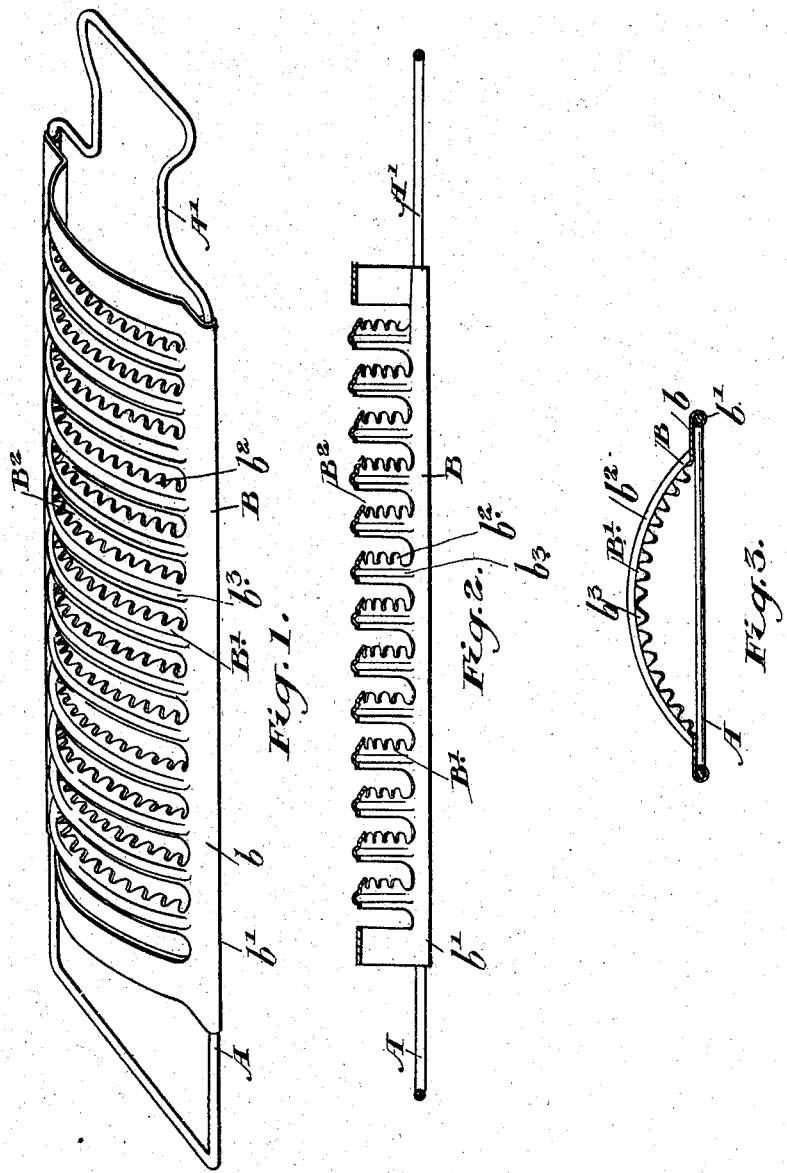

UNITED STATES PATENT OFFICE.

WILLIAM JAMISON CURRY, OF TORONTO, CANADA.

GRATER.

No. 806,646. Specification of Letters Patent. Patented Dec. 5, 1905.

Application filed January 11, 1905. Renewed November 9, 1905. Serial No. 286,600.

*To all whom it may concern:*

Be it known that I, WILLIAM JAMISON CURRY, of the city of Toronto, in the county of York, in the Province of Ontario, Canada, have invented certain new and useful Improvements in Graters, of which the following is the specification.

My invention relates to improvements in graters; and the object of the invention is to devise a simple, strong, and efficient, rapid, and easily-cleaned grater particularly adaptable for the grating of vegetable and animal substances; and it consists, essentially, of a grater comprising a reinforcing-frame and a plate having the side lips bent around the frame, the said plate being arc-shaped in cross-section for the major intermediate portion of its width and flat at the sides and being formed with a series of bars and openings between them, the said bars having reinforcing-ribs struck or formed out of the same and a continuous lower edge and a serrated upper edge the teeth of which are rounded and inwardly turned, the parts being arranged and constructed in detail as hereinafter more particularly explained.

Figure 1 is a perspective view of my improved grater. Fig. 2 is a longitudinal section. Fig. 3 is a cross-section.

In the drawings like letters of reference indicate corresponding parts in each figure.

A is the frame of the grater, which is formed of a stiff wire and is made substantially rectangular at the bottom and at the top is formed into a handle shape A'.

B is the grating-plate, which is arc-shaped in cross-section in the intermediate portion and is provided with flat sides $b$, which at the outer end terminate in circular lips $b'$, which are bent around the frame, and thereby hold the grating-plate in position.

The plate B is provided with a series of bars B', having contiguous openings $B^2$. The bottom of the bar B' has a smooth edge following the contour of the bar, and the top of the bar is provided with a series of teeth $b^2$, having rounded inturned cutting ends. The bar has also pressed or formed out of the same a strengthening-rib $b^3$, which extends from one flat side $b$ to the other, and thereby reinforces the bar throughout its length and prevents any liability of such bar bending.

It will be seen that as the teeth $b^2$ are turned inwardly the grating will be done on the concaved side of the plate B, and as the teeth are rounded the substance grated will be more readily cut and shredded than in the ordinary form of grater, making it especially adapted for potatoes and other vegetables.

What I claim as my invention is—

1. A grater comprising a frame and a grater-plate arc-shaped in cross-section for the major portion of its width and having flat sides terminating in portions curling around the sides of the frame and provided with a series of bars and contiguous openings from end to end, the cutting edge of the bar having teeth formed up in the same turned inwardly to the concaved side and rounded at the crown as and for the purpose specified.

2. A grater comprising a frame and a grater-plate arc-shaped in cross-section for the major portion of its width and having flat sides terminating in portions curling around the sides of the frame and provided with a series of bars and contiguous openings from end to end, the cutting edge of the bar having teeth formed up in the same turned inwardly to the concaved side and rounded at the crown, and each bar having a reinforcing-rib formed or struck up in same and extending from one flat side to the other as and for the purpose specified.

WILLIAM JAMISON CURRY.

Witnesses:
B. BOYD,
E. B. MATTHEWS.